United States Patent [19]

Feuerhahn

[11] Patent Number: 4,524,161
[45] Date of Patent: Jun. 18, 1985

[54] PROCESS FOR PREPARING AQUEOUS BINDER COMPOSITIONS

[75] Inventor: Martin P. O. Feuerhahn, Amsterdam, Netherlands

[73] Assignee: Shell Oil Company, Houston, Tex.

[21] Appl. No.: 640,915

[22] Filed: Aug. 15, 1984

[30] Foreign Application Priority Data

Aug. 24, 1983 [GB] United Kingdom ................ 8322710

[51] Int. Cl.³ .................... C09D 3/58; C09D 3/66; C09D 5/02
[52] U.S. Cl. .................... 523/414; 523/333
[58] Field of Search ................ 523/414, 333

[56] References Cited

U.S. PATENT DOCUMENTS

| | | | |
|---|---|---|---|
| 2,134,741 | 11/1938 | Silleck | 523/333 |
| 3,787,230 | 1/1974 | Hoffman et al. | 427/336 |
| 4,100,315 | 7/1978 | Lauterbach | 427/386 |
| 4,446,257 | 5/1984 | Kooijmans et al. | 523/403 |

FOREIGN PATENT DOCUMENTS

| | | | |
|---|---|---|---|
| 720880 | 11/1965 | Canada | 524/904 |
| EP40869 | 12/1981 | European Pat. Off. | |
| 2060574 | 6/1971 | Fed. Rep. of Germany | 524/904 |
| 1962395 | 9/1971 | Fed. Rep. of Germany | 523/414 |
| 609099 | 9/1948 | United Kingdom | 523/333 |

*Primary Examiner*—Ronald W. Griffin
*Attorney, Agent, or Firm*—Dean F. Vance

[57] ABSTRACT

The invention provides a process for preparing an aqueous binder composition which comprises (a) dispersing pigment powder having a particle size less than 20 micrometers in a liquid, solvent-free epoxy resin, (b) dispersing the resultant paste in water, (c) reacting the resultant dispersion with a secondary amine, and optionally a primary amine, the amount of amine or amines being sufficient to provide at least one N—H function per epoxy group of the epoxy resin, at a temperature in the range 40° C. to 100° C., and (d) neutralizing the resulting suspension of epoxy-amine adduct coated particles, and (e) optionally adjusting the concentration of the resulting dispersion within the range 35 to 75% w solids by addition of water.

Aqueous paint compositions are prepared from the binder compositions by (f) adding a crosslinking agent, and (g) adjusting, if necessary the concentration of the composition by addition of water to ensure a solids content in the range 10 to 65% w.

9 Claims, No Drawings

PROCESS FOR PREPARING AQUEOUS BINDER COMPOSITIONS

FIELD OF THE INVENTION

This invention relates to a process for preparing an aqueous binder composition, to a process for preparing an aqueous paint composition from said binder composition, to the compositions whenever prepared by the respective processes, and to use of the paint composition in coating surfaces.

BACKGROUND OF THE INVENTION

U.S. Pat. No. 3,787,230 discloses a method of coating an article by applying an aqueous slurry of a powder paint onto the surface. The powder paint is a commercial powder, having an average particle size of 36 micrometers, and the slurry has to be kept homogeneous by agitation during preparation and use. On storage the solid matter of such a slurry will settle, and it is technically unattractive to redisperse it again immediately before use.

U.S. Pat. No. 4,100,315 discloses a method of preparing aqueous coating powder dispersions containing as the binder a solid epoxy resin, which is micronized in water in the presence of a specific combination of surfactants. For many applications, however, the presence of surfactants in the cured coating is not desirable.

Patent application Ser. No. 382,534, filed May 27, 1982, now U.S. Pat. No. 4,446,257, issued May 1, 1984, discloses the preparation of an aqueous coating powder suspension in which the powder particles comprise an intimate mixture of binder components:
(a) an epoxy resin/amine adduct having terminal amino groups;
(b) a crosslinking component, and optionally
(c) a solid polyepoxide,
the mixture having a softening point of at least 70° C., wherein the solid paint components are intimately blended, extruded and ground to a powder, and the particle size in the suspension is reduced below 20 micrometers by milling.

SUMMARY OF THE INVENTION

The present invention provides processes for preparing aqueous binder and paint compositions without necessity of surfactants and without the necessity of extruding, grinding and milling in water.

Accordingly, the present invention provides a process for preparing an aqueous binder composition which comprises
(a) dispersing pigment powder having a particle size less than 20 micrometers in a liquid, solvent-free epoxy resin,
(b) dispersing the resultant paste in water,
(c) reacting the resultant dispersion with a secondary amine, and, optionally, a primary amine, the amount of amine or amines being sufficient to provide at least one N—H function per epoxy group of the epoxy resin, at a temperature in the range 40° C. to 100° C., and
(d) neutralizing the resulting suspension of epoxy-amine adduct coated particles, and
(e) optionally, adjusting the concentration of the resulting dispersion within the range 35 to 75%w solids by addition of water.

The invention further provides a process for preparing an aqueous paint composition which comprises
(f) adding to an aqueous binder composition prepared by the process of the invention, a crosslinking agent, and
(g) adjusting, if necessary, the concentration of the composition by addition of water to ensure a solids content in the range 10 to 65%w.

The term "pigment powder" includes all water-insoluble solid paint additives such as conventional pigments, fillers and extenders. Examples of such materials include titanium oxide, barytes, clay, microtalc and black iron oxide. The particle size of the pigment powder is less than 20 micrometers, preferably less than 10 micrometers, and advantageously less than 5 micrometers.

DESCRIPTION OF THE PREFERRED EMBODIMENT

The epoxy resin is preferably a polyglycidyl ether of a polyhydric phenol and may if desired be a liquid grade of epoxy novolac resin. Advantageously the epoxy resin is a liquid polyglycidyl ether of a dihydric phenol. Conveniently the epoxy resin is a liquid polyglycidyl ether of 2,2-bis(4-hydroxyphenyl)propane. Provided that the eventual epoxy-amine adduct includes on average at least two hydroxy moieties per molecule, the epoxy resin may, if desired, be a liquid monoglycidyl compound.

Epoxy compounds can react with amines having at least one reactive N—H function according to the general addition reaction:

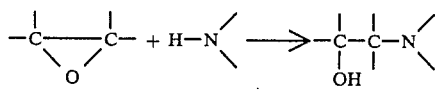

The secondary amine (and, when present, the primary amine) employed in step (c) may contain one or more substituents which do not react with epoxy groups under the reaction conditions, e.g. hydroxyl, ketimine and ester groups. Suitable secondary amines include dialkanolamines, N-alkyl alkanolamines, dialkyl amines and adducts of alkanolamines with aliphatic monoepoxides.

Preferably, the secondary amine comprises at least one compound selected from the group consisting of di($C_{2-6}$ alkanol) amines, N—$C_{1-6}$ alkyl-$C_{2-6}$ alkanolamines, di-$C_{2-6}$ alkylamines and adducts of $C_{2-6}$ alkanolamines with $C_{9-25}$ aliphatic monoepoxides. Examples of such secondary amines are diethanolamine, di-isopropanolamine, N-methylethanolamine, diethylamine and the adduct of monoethanolamine with a $C_{9-14}$, preferably $C_{12-14}$, aliphatic monoglycidyl ether. Mixtures of secondary amines may be employed.

The primary amine, when included, in conveniently added after reaction between the epoxy resin and the secondary amine is substantially complete. The primary amine is preferably an alkanolamine, advantageously a $C_{2-6}$ alkanolamine, such as monoethanolamine or monoisopropanolamine.

The reaction temperature in step (c) is preferably at least 60° C., and is preferably not greater than 80° C.

In step (d), the suspension is preferably neutralized to a degree of neutralization in the range 0.7 to 1.5, more preferably 1.0 to 1.5, by addition of a monobasic carboxylic acid, advantageously a $C_{2-6}$ carboxylic acid such as acetic acid.

The epoxy resin/amine adducts produced in step (c) above have a plurality of alcoholic hydroxyl functions per molecule, at least part of these formed by the addition reaction of epoxy with a N—H function. Additional hydroxyl functions will be present when the amine and/or the epoxy resin starting materials already contain hydroxyl groups.

Suitable crosslinking agents for step (f) are compounds or compositions having a plurality of groups which are reactive with alcoholic functions during cure. Well-known crosslinking agents of this type are phenolic resins, in particular resoles; aminoplast resins such as those derived from urea, melamine or benzoguanamine; blocked polyisocyanates; and preferably non-acidic polyesters of polycarboxylic acids which esters have more than one, and preferably at least two, beta-hydroxyl ester groups per molecule. When such polyesters are used, a transesterification-promoting metal compound is also incorporated in the paint composition.

Phenolic resins of the resole type contain methylol groups which may be etherified and which can react with hydroxyl groups of the epoxy resin/amine adduct; in addition crosslinking reactions can occur between the resole molecules themselves.

Aminoplast resins as used generally in thermosetting resin systems may be derived from urea, melamine, or benzoguanamine, and an aldehyde, usually formaldehyde, and generally etherified with a lower alcohol such as methanol, ethanol or butanol.

Polyisocyanate derivatives to be used in aqueous thermosetting resin systems have to be blocked with a reactant that effectively blocks the isocyanate groups at temperatures used in the preparation of the system, and setting them free at curing temperatures, generally above 120° C. Examples of suitable blocking agents are monohydric alcohols, monohydric phenols and certain nitrogen compounds, such as caprolactam.

Non-acidic polyesters of polycarboxylic acids have an acid value not greater than 0.18 meq/g (acid number not more than 10), preferably not more than 0.09 meq/g. Beta-hydroxyl ester in this context means that alcohol-derived moiety of the ester has a beta-hydroxyl group; in other words the ester function is a derivative of a 1,2-glycol of which only one of the hydroxyl functions has been esterified. The glycol part may hve substitutents, such as alkyl, ether or stable ester groups. The beta-hydroxyl group is needed for sufficient crosslinking at acceptable temperatures within acceptable times, for example at temperatures up to 200° C. and curing times of up to 30 minutes. By the process of curing or stoving the coating, beta-hydroxyl ester groups of the polyester transesterify to the effect that ester bonds are formed between carboxyl groups of the polyester and hydroxyl groups of the epoxy-amine adduct with release of a glycol-type compound; the latter may then evaporate. The result is a cross-linked coating which is solvent-resistant and infusible.

Suitable non-acidic polyesters having beta-hydroxylester groups can be prepared from a polycarboxylic acid or anhydride thereof, and one or more glycols, and/or mono-epoxides, for example from azelaic acid, terephthalic acid, isophthalic acid, phthalic anhydride, trimellitic anhydride; ethylene glycol; ethylene oxide, propylene oxide, glycidyl esters of $C_{10}$ monocarboxylic acids. Examples of polyesters are bis(2-hydroxyethyl)-terephthalate, lower (2-hydroxyethyl)-terminated polyalkylene glycol terephthalates, and the di-beta-hydroxy ester reaction product of azelaic acid and the glycidyl ester of a saturated $C_{10}$ monocarboxylic acid.

Advantageously, the crosslinking agent added in step (f) may have pigment powder dispersed therein.

The transesterification-promoting metal compound may be one which is soluble in the non-acidic polyester, in which case it is conveniently added to the composition in step (f), dissolved in the non-acidic polyester, or it may be one which is water-soluble or is a water-insoluble compound in a water-dispersible formulation, in which case it may conveniently be incorporated in the composition during or after any one of steps (e), (f) and (g).

Suitable transesterification-promoting metal compounds include, for example, salts (e.g. octoates or naphthenates) of lead, zinc, calcium, barium and iron-(III). A suitable example of a metal complex is titanium acetyl acetonate. Other suitable salts, although in general less active than those mentioned above, are salts of tin(II), manganese, cobalt and dibutyltin, for example dibutyltin dilaurate. Further metal salts that can be mentioned in general are octoates and naphthenates of the alkali and earth alkali metals, of the lanthanides, and of zirconium, cadmium, chromium, and acetyl acetonate complexes of lead, zinc, cadmium, cerium, thorium and copper. Zinc octoate and zinc acetate have been found to give very acceptable results. Mixtures of such salts and/or complexes may be used.

Metal content of the transesterification-promoting metal compound should preferably be in the range 0.3 to 2%w, advantageously 0.5 to 1.8%w, based on the combined weight of all organic material in the paint composition.

The invention also includes binder and paint compositions prepared by the processes of the invention.

In the paint compositions the pigment/binder ratio, where "binder" denotes all organic material present, preferably lies in the range 0.4:1 to 1:1.

The paint composition may contain, apart from the pigment powder incorporated in step (a) and any pigment powder incorporated in the crosslinking agent added in step (f), additional components usual in paints, such as pigments, fillers, thixotropic agents, stabilizers, softening agents, flow control agents and disinfectants.

The water to be used in the processes of the invention is preferably purified, by distillation or demineralization, and may contain suitable additives such as disinfecting agents and softening agents.

The invention also provides a process for coating a surface which comprises applying to the surface a paint composition of the invention, drying the composition and curing by action of heat.

The paint compositions may be applied to a substrate by means known in the art, such as by brush or roller, or by spraying or dipping onto a variety of materials, preferably on metals such as bare steel, phosphated steel, zinc, tin plate, as the case may be as the sole coating layer, or as a primer or primer-surfacer (for example, on a primer layer applied by electrodeposition). The paint compositions are particularly suitable for spray application as a primer-surfacer. For such applications, the concentration of the composition in step (g) should be adjusted to a solids content in the range 30 to 65%w.

Paint compositions whose solids content is adjusted in step (g) to 10 to 30%w may also be applied to a substrate by cathodic electrodeposition, as a primer.

The water may be evaporated and the coating be cured by usual means, such as by stoving or by heat radiation. Stoving time and temperature will be dependent on the particular binder combination, and will be in a range usual for thermosetting surface coatings, in general from 140° C. to 200° C. with curing times varying from 10 to 30 minutes.

The invention will be further understood from the following illustrative examples, of which Examples 1 to 4 relate to the preparation of aqueous binder composition, Example 5 relates to the preparation of a liquid di-$\beta$-hydroxyester (crosslinking agent) and Examples 6 to 18 relate to the preparation of aqueous particle-slurry paint compositions. In the Examples, parts and percentages are by weight, unless otherwise indicated. Analytical data are based on non-volatile matter.

Filler components (titanium oxide, barytes, clay, microtalc, black iron oxide) all had particle size less than 20 micrometers.

Polyether A is a commercial liquid polyglycidyl ether of 2,2-bis(4-hydroxyphenyl)propane having an epoxy molar mass of 188.

Glycidyl ester CIOE ("CARDURA-E 10") (registered trademark) is the glycidyl ester of saturated $C_{10}$ monocarboxylic acids, wherein the alpha-carbon atom is attached to three alkyl groups, at least one of which is always methyl.

"CYMEL 301" (registered trade mark) is a methylated condensation product of melamine and formaldehyde.

Water is demineralized water.

EXAMPLE 1

Titanium oxide (102.8 g) and barytes (128.8 g) were blended together, and the resultant blend was incorporated portionwise with high speed stirring into polyether A (188 g, 1 epoxy equivalent). High speed stirring was maintained for 10 minutes after addition of the blend was complete, yielding a homogeneous paste. This paste was heated to 60° C. and demineralized water (134.7 g) at 60° C. was added with stirring, followed by N-methyl ethanolamine (18.75 g, 0.25 mol) and diethylamine (18.25 g, 0.25 mol). The temperature of the resulting aqueous suspension was allowed to rise as a result of exothermic reaction. When reaction was complete (no further temperature rise beyond 65° C.), the mixture was heated to 70° C. and monoethanolamine (15.25 g, 0.25 mol) was added. The temperature of the resulting mixture was allowed to rise as a result of exothermic reaction to 80° C. When reaction was complete (no further temperature rise), epoxy group content of the mixture was less than 0.01 milliequivalent per gram (meq/g) solids. Glacial acetic acid (67.5 g) was added carefully, with stirring, and on cooling to ambient temperature (20° C.), a semi-solid white aqueous binder paste was obtained having solids content 70%w, degree of neutralization of amino-nitrogen atoms of 1.5, pigment/binder solids weight ratio 0.96:1 and calculated average molecular weight binder, $\overline{Mw}$, of 969 g.

EXAMPLE 2

To monoethanolamine (122 g, 2 mol) at 50° C. was added, dropwise, an aliphatic monoglycidyl ether having on average 12 to 14 carbon atoms per molecule (582 g, 2 mol), while not allowing the temperature of the mixture to exceed 80° C. After all the monoglycidyl ether had been added, the mixture was heated at 80° C. to 100° C. for 30 minutes to ensure that reaction was complete. The resulting adduct product was a yellow oily liquid above 40° C. and a fatty yellow-white mass at ambient temperatures (20° C.). Epoxy group content was below 0.01 meq/g, and calculated average molecular weight, $\overline{Mw}$, was 352 g.

Titanium oxide (131.5 g) and barytes (164.6 g) were blended together and the resultant blend was incorporated portionwise with high speed stirring into polyether A (188 g, 1 epoxy equivalent). High speed stirring was maintained for 10 minutes after addition of the blend was complete, and an aqueous suspension of the resulting homogeneous paste was prepared at 60° C. by addition of demineralized water (211.2 g). N-methyl ethanolamine (18.75 g, 0.25 mol) and a portion of the above adduct product (88 g, 0.25 mol) were added and when reaction was complete (no further temperature rise), the mixture was heated to 70° C. and monoethanolamine (15.25 g, 0.25 mol) was added. On completion of reaction (epoxy group content less than 0.01 meq/g solids), glacial acetic acid (48.6 g) was added carefully with stirring, and on cooling to ambient temperature (20° C.) a semi-solid white aqueous binder paste was obtained having solids content 70%w, degree of neutralization of amine-nitrogen atoms of 1.08, pigment/binder solids weight ratio of 0.96:1, and calculated average molecular weight of binder, $\overline{Mw}$, of 1240 g/mol.

EXAMPLE 3

Titanium oxide (76.2 g), barytes (148.2 g) and microtalc extender (12.0 g) were blended together and the resulting blend was incorporated portionwise into polyether A (188 g, 1 epoxy equivalent) with high speed stirring, as in Example 1. The resulting paste was heated to 60° C. and demineralized water (159.3 g) at 60° C. was added with stirring, followed by N-methyl ethanolamine (18.75 g, 0.25 mol) and diethylamine (18.25 g, 0.25 mol). Reaction was monitored as in Example 1, and on completion thereof monoethanolamine (15.25 g, 0.25 mol) was added. Further reaction was monitored as in Example 1, and on completion (epoxy group content less than 0.01 meq/g solids) glacial acetic acid (45 g) was added and the resulting mixture was diluted with a second quantity of demineralized water (510.8 g). At ambient temperature (20° C.) the resulting aqueous binder dispersion was a pourable white viscous liquid having solids content of 40%w, degree of neutralization of aminenitrogen atoms of 1.0, and pigment/binder solids weight ratio of 0.98:1. The dispersion was stable and even after storage for 1 month at ambient temperature (20° C.) no settlement or flocculation of dispersed solids was observed.

EXAMPLE 4

An aqueous binder dispersion was prepared by a process similar to that of Example 3, except that in place of the blend of titanium oxide, barytes and microtalc extender there was used a blend of titanium oxide (72.1 g), barytes (72.1 g), clay extender (12.0 g) and black iron oxide (4.8 g), and the amounts of demineralized water employed were such that before addition of the second quantity of demineralized water solids content was 70%w, and after the addition solids content was 40%w. The resulting aqueous binder dispersion was a pourable grey viscous liquid hving degree of neutralization 1.0 and pigment/binder solids ratio 0.67:1.

EXAMPLE 5

Azelaic acid (1128 g, 6 mol) and glycidyl ester CIOE (3048 g, 12 mol) were heated together at 90° C. for one hour. To the resulting clear mass was added a catalytic amount of benzyldimethylamine (10.4 g, 0.25%w) and the temperature was allowed to rise as a result of exothermic reaction to 140° C. After two hours at this temperature the reaction mixture was cooled to ambient temperature to yield a liquid di-$\beta$-hydroxy ester having acid content 0.01 meq/g, epoxy group content 0.07 meq/g and calculated average molecular weight, $\overline{Mw}$, 692 g.

EXAMPLE 6

The aqueous binder paste of Example 1 (674 g) was diluted with water (270 g) to a solids content of 50%w. The liquid di-$\beta$-hydroxy ester of Example 5 (173 g) was incorporated into the resulting aqueous dispersion with high speed stirring. Zinc octoate (16.2 g, zinc content 23%w) and water (39 g) were added to the mixture with stirring, to yield the desired aqueous particle-slurry paint composition.

EXAMPLE 7

Titanium oxide (173 g) and barytes (110 g) were dispersed into liquid di-$\beta$-hydroxy ester of Example 5 (346 g), and the resulting dispersion was incorporated with high speed stirring into the aqueous binder paste of Example 1 (674 g). Zinc octoate (22.9 g) and water (405 g) were added to the mixture with stirring, to yield an aqueous particle-slurry paint composition.

EXAMPLE 8

The procedure of Example 7 was followed with the exception that the zinc octoate was incorporated in the dispersion of titanium oxide and barytes in the di-$\beta$-hydroxy ester, before mixing the dispersion with the aqueous binder paste.

EXAMPLE 9

Titanium oxide (110 g), barytes (213 g), microtalc extender (17 g) and black iron oxide (4.8 g) were dispersed into liquid di-$\beta$-hydroxy ester of Example 5 (346 g), and the resulting dispersion was incorporated with high speed stirring into the aqueous binder dispersion of Example 3 (1192 g) to form a concentrated mixture. A water-dispersible zinc octoate composition (48 g, zinc content 11%w) was dispersed into water (750 g) and the resulting zinc octoate dispersion was added to the concentrated mixture, with stirring, to yield an aqueous particle-slurry paint composition.

EXAMPLE 10

Titanium oxide (35 g), barytes (60 g), microtalc extender (5 g) and black iron oxide (10 g) were dispersed into liquid di-$\beta$-hydroxy ester of Example 5 (346 g), and the resulting dispersion was incorporated with high speed stirring into aqueous binder dispersion of Example 3 (1192 g) to form a concentrated mixture. Water dispersible zinc octoate composition (48 g, zinc content 11%w) was dispersed into water (492 g) and the resulting zinc octoate dispersion was added to the concentrated mixture, with stirring, to yield an aqueous particle-slurry paint composition.

EXAMPLE 11

Titanium oxide (110 g), barytes (213 g) and microtalc extender (17 g) were dispersed into liquid di-$\beta$-hydroxy ester of Example 5 (346 g), and the resulting dispersion was incorporated with high speed stirring into aqueous binder dispersion of Example 3 (1192 g) to form a concentrated mixture. Zinc acetate dihydrate (18.2 g) was dissolved in water (750 g), and the resulting solution was added to the concentrated mixture, with stirring, to yield an aqueous particle-slurry paint composition.

EXAMPLE 12

Titanium oxide (104 g), barytes (104 g), clay extender (17 g) and black iron oxide (7 g) were dispersed into liquid di-$\beta$-hydroxy ester of Example 5 (346 g), and the resulting dispersion was incorporated with high speed stirring into the aqueous binder dispersion of Example 4 (1003 g). The pH of the resultant concentrated mixture was adjusted to 4.8 by careful addition of glacial acetic acid. A solution of zinc acetate dihydrate (18.2 g) in water (845 g) was added to the concentrated mixture, with stirring, to yield an aqueous particle-slurry paint composition.

EXAMPLE 13

The procedure of Example 12 was followed except that the pH was adjusted to 5.2 (instead of 4.8) and thereafter additional water (350 g) was incorporated in forming the aqueous particle-slurry paint composition.

EXAMPLE 14

A solution of zinc acetate dihydrate (20 g) in water (240 g) was incorporated at 60° C., with stirring, into the aqueous binder paste of Example 2 (866 g). The resulting binder dispersion was allowed to cool to ambient temperature (20° C.). Titanium oxide (63 g), barytes (29 g), clay extender (33 g) and black iron oxide (13 g) were dispersed into liquid di-$\beta$-hydroxy ester of Example 5 (346 g), and the resulting dispersion was incorporated with high speed stirring into the binder dispersion. Addition of water (2024 g) to the resulting highly viscous slurry, with high speed stirring, yielded an aqueous particle-slurry paint composition.

EXAMPLE 15

Aqueous binder paste of Example 1 (674 g) was diluted with water (270 g) to a solids content of 50%w. Titanium oxide (87 g) and barytes (55 g) were dispersed into liquid di-$\beta$-hydroxy ester of Example 5 (173 g), and the resulting dispersion was then together with zinc octoate (16.2 g, zinc content 23%w) incorporated with high speed stirring into the aqueous binder dispersion. The resulting composition was blended with "CYMEL 301" (137 g) and more water (433 g) was added, to yield the desired aqueous particle-slurry paint composition.

EXAMPLE 16

Titanium oxide (104 g), barytes (104 g), clay extender (17 g) and black iron oxide (7 g) were dispersed into a mixture of liquid di-$\beta$-hydroxy ester of Example 5 (173 g) and "CYMEL 301" (173 g). The resulting dispersion was incorporated with high speed stirring into aqueous binder dispersion of Example 4 (1003 g), followed by addition of a solution of zinc acetate dihydrate (18.2 g) in water (484 g) to yield the desired aqueous particle-slurry paint composition.

EXAMPLE 17

A solution of zinc acetate dihydrate (20 g) in water (240 g) was incorporated at 60° C., with stirring, into aqueous binder paste of Example 2 (886 g). The resulting binder dispersion was allowed to cool to ambient temperature (20° C.). Titanium oxide (63 g), barytes (29 g), clay extender (33 g) and black iron oxide (13 g) were dispersed into liquid di-β-hydroxy ester of Example 5 (346 g), and the resulting dispersion was incorporated with high speed stirring into the binder dispersion, followed by "CYMEL 301" (266 g), and then water (1514 g), to yield the desired aqueous particle-slurry paint composition.

EXAMPLE 18

A solution of zinc acetate dihydrate (20 g) in water (240 g) was incorporated at 60° C., with stirring, into aqueous binder paste of Example 2 (866 g). The resulting binder dispersion was allowed to cool to ambient temperature (20° C.). Liquid di-β-hydroxy ester of Example 5 (173 g) and "CYMEL 301" (246 g) were incorporated with high speed stirring into the binder dispersion, followed by addition of water (1018 g), to yield the desired aqueous particle-slurry paint composition.

Properties of the aqueous particle-slurry paint compositions of Examples 6 to 18 are given in Table 1.

TABLE 1

| Example | Pigment/binder ratio (w/w) | DN | pH | Solids (% w) | Viscosity at 23° C. (Pa · s) | Storage stability (23° C.) |
|---|---|---|---|---|---|---|
| 6 | 0.56 | 1.5 | 4.5 | 55 | — | E |
| 7 | 0.88 | 1.5 | 4.5 | 55 | — | E |
| 8 | 0.88 | 1.5 | 4.5 | 55 | — | E |
| 9 | 0.99 | 1.0 | 6.8 | 44 | 1.5 | G |
| 10 | 0.59 | 1.0 | 6.2 | 42.6 | 1.95 | G |
| 11 | 0.98 | 1.0 | 6.8 | 44 | 0.5 | E |
| 12 | 0.67 | >1.0 | 4.8 | 40 | 1.9 | G |
| 13 | 0.67 | >1.0 | 5.2 | 35 | 0.95 | G |
| 14 | 0.66 | 1.08 | 5.6 | 27 | — | G |
| 15 | 0.64 | 1.5 | 5.3 | 55 | 1.8 | G |
| 16 | 0.67 | 1.0 | 5.9 | 47 | 2.1 | G |
| 17 | 0.47 | 1.08 | 5.7 | 40 | 0.65 | G |
| 18 | 0.41 | 1.08 | 5.7 | 40 | 3.0 | G |

In the above Table 1, "pigment" denotes all filler components e.g. titanium oxide, barytes, clay, microtalc and black iron oxide, and "binder" denotes combined weight of all organic material. In all of Examples 6 to 18 zinc was present in an amount of 0.9%w based on combined weight of all organic material.

"DN" denotes degree of neutralization of amino-nitrogen atoms in the binder.

Viscosity was measured at 23° C. using a Brookfield (trade mark) viscometer.

Storage stability was assessed after four weeks storage at 23° C. according to the following scale:

E (excellent): no more than easily-redispersed, slight settlement of solids, no change in overall viscosity.

G (good): settlement of solids without cake formation easily redispersed, no change in overall viscosity.

M (moderate): as "G" but increase in overall viscosity.

P (poor): settlement of solids with cake formation, difficult to redisperse.

The aqueous particle-slurry paint composition of Example 6 to 18 were tested by spraying onto steel panels which were dried for 3 minutes at 40° C. and cured by stoving for 20 minutes at 180° C. Measurement of film thickness and assessment of appearance, mechanical properties, and solvent and water resistance were effected using phosphated steel panels. Salt-spray resistance was assessed using degreased steel panels.

Results of the tests are given in Table 2 following, in which "MEK rubs" is the number of double rubs given to the cured coating with a cloth wetted with methyl ethyl ketone until the coating began to swell or disintegrate ("MEK rubs") ≧ 50 is indicative of good cure and good solvent resistance), and impact strength is reversed impact strength determined according to the British Standard Falling Ball test, but recorded in cm.kg. (>90 cm.kg. indicates very good cure).

Water resistance is assessed visually on the coating submerged in water at the temperature indicated and for the time indicated, and according to the following scale: E (excellent), G (good, some blisters), M (moderate, many blisters), P (poor, unacceptable blistering).

Salt spray resistance was carried out according to ASTM-B 117-64 and is recorded as mm loss of adhesion from scratch after the number of days indicated.

Appearance was assessed visually, and in general the coatings were smooth (sm) and were slightly glossy (sl.g) or matt (m).

TABLE 2

| Example | Film thickness (micrometers) | Film appearance | MEK rubs | Impact strength cm.kg. | Mandrel bend (conical) | Water resistance boiling (3 days) | Water resistance 70° C. (5 days) | Salt spray resistance (5 days)(mm) |
|---|---|---|---|---|---|---|---|---|
| 6 | 40 | sm, sl.g | 30 | <10 | passed | — | — | — |
| 7 | 35 | sm, m | >50 | >80 | passed | G | E | 1 |
| 8 | 37 | sm, m | >50 | >80 | passed | G | E | 1 |
| 9 | 33 | sm, m | >50 | >80 | passed | G | G | 0-1 |
| 10 | 34 | sm, sl.g | >50 | ≧20 | passed | M | E | 0-1 |
| 11 | 40 | sm, m | >50 | ≧30 | passed | — | — | 0 |
| 12 | 35 | sm, m | >50 | ≧30 | passed | G | E | — |
| 13 | 37 | sm, m | >50 | ≧40 | passed | M | E | 0-1 |
| 14 | 31 | sm, m | >50 | >80 | passed | — | — | — |
| 15 | 38 | sm, sl.g | >50 | ≧30 | passed | G | G | 1-2 |
| 16 | 35 | sm, sl.g | >50 | ≧30 | passed | E | E | 0 |
| 17 | 30 | sm, sl.g | >50 | >80 | passed | G | E | 2 |
| 18 | 38 | sm, m | >50 | ≧30 | passed | — | E | 2 |

What is claimed is:

1. A process for preparing an aqueous binder composition which comprises
   (a) dispersing a pigment powder having a particle size less than 20 micrometers in a liquid, solvent-free epoxy resin,
   (b) dispersing the resultant paste in water,
   (c) reacting the resultant dispersion with a secondary amine or a secondary amine and a primary amine, the amount of amine or amines being sufficient to provide at least one N—H function per epoxy group of the epoxy resin, at a temperature from about 40° C. to about 100° C., (d) neutralizing the resulting suspension of epoxy-amine adduct coated particles, and, as desired, (e) adjusting the concentration of the resulting dispersion within the range 35 to 75%w solids by addition of water.

2. The process of claim 1 wherein the liquid, solvent-free epoxy resin is a polyglycidyl ether of a dihydric phenol.

3. The process of claim 1 wherein the secondary amine comprises at least one compound selected from the group consisting of di($C_{2-6}$ alkanol)amines, N—$C_{1-6}$ alkyl-$C_{2-6}$ alkanolamines, di-$C_{1-6}$ alkylamines and adducts of $C_{2-6}$ alkanolamines with $C_{9-25}$ aliphatic monoepoxides.

4. The process of claim 1 wherein the primary amine is a $C_{2-6}$ alkanolamine.

5. The process of claim 1 wherein in step (d) the suspension is neutralized to a degree of neutralization in the range from about 0.7 to about 1.5 by addition of a monobasic $C_{2-6}$ carboxylic acid.

6. A process for preparing an aqueous paint composition which comprises (f) adding a crosslinking agent to an aqueous binder composition prepared by the process of claim 1 and (g) adjusting, if necessary, the concentration of the composition by addition of water to ensure a solids content in the range of from 10 to 65%w.

7. The process of claim 6 wherein the crosslinking agent comprises a non-acidic polyester of a polycarboxylic acid, having more than one beta-hydroxyl group per molecule, and wherein a transesterification-promoting metal compound is incorporated in the composition.

8. The process of claim 7 wherein the metal compound is soluble in the non-acidic polyester and is added to the composition in step (f), dissolved in the non-acidic polyester.

9. The process of claim 7 wherein the metal compound is water-soluble or is a water-insoluble compound in a water-dispersible formulation and is incorporated in the composition during or after any one of step (e), (f) and (g).

* * * * *